(12) United States Patent
Hamada

(10) Patent No.: US 7,734,599 B2
(45) Date of Patent: Jun. 8, 2010

(54) INFORMATION PROCESSING APPARATUS, IMAGE PROCESSING APPARATUS, INFORMATION PROCESSING METHOD, CONTROL METHOD FOR IMAGE PROCESSING APPARATUS, COMPUTER PROGRAM, AND STORAGE MEDIUM

(75) Inventor: Noboru Hamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 227 days.

(21) Appl. No.: 11/151,942

(22) Filed: Jun. 14, 2005

(65) Prior Publication Data

US 2006/0026150 A1    Feb. 2, 2006

(30) Foreign Application Priority Data

Jun. 25, 2004   (JP)   .............................. 2004-188488

(51) Int. Cl.
G06F 17/30   (2006.01)
(52) U.S. Cl. ................................................ 707/693
(58) Field of Classification Search ........................ None
See application file for complete search history.

(56) References Cited

U.S. PATENT DOCUMENTS

| 6,131,162 | A | * | 10/2000 | Yoshiura et al. ............. 713/176 |
| 6,311,271 | B1 | | 10/2001 | Gennaro et al. |
| 7,003,667 | B1 | * | 2/2006 | Slick et al. .................... 713/182 |
| 2001/0018739 | A1 | * | 8/2001 | Anderson et al. ............ 713/176 |
| 2002/0042884 | A1 | | 4/2002 | Wu et al. |
| 2003/0110296 | A1 | * | 6/2003 | Kirsch et al. ................. 709/246 |
| 2004/0199570 | A1 | * | 10/2004 | Terao .......................... 709/201 |
| 2005/0071640 | A1 | * | 3/2005 | Sprunk et al. ................ 713/176 |
| 2005/0125549 | A1 | * | 6/2005 | Katayama .................... 709/230 |

FOREIGN PATENT DOCUMENTS

| JP | 2001-223735 A | 8/2001 |
| JP | 2002-169681 A | 6/2002 |
| JP | 2003-084962 A | 3/2003 |
| JP | 2003-122521 A | 4/2003 |

* cited by examiner

Primary Examiner—Don Wong
Assistant Examiner—Belinda Xue
(74) Attorney, Agent, or Firm—Canon USA Inc IP Division

(57) ABSTRACT

An information processing apparatus divides print data into data pieces and generates a hash value of each data piece. The information processing apparatus generates one unit of transmitting data by adding the generated hash value to a data piece different from the data piece whose hash value is generated, and transmits the transmitting data to an image processing apparatus.

4 Claims, 7 Drawing Sheets

INFORMATION PROCESSING APPARATUS, IMAGE PROCESSING APPARATUS, INFORMATION PROCESSING METHOD, CONTROL METHOD FOR IMAGE PROCESSING APPARATUS, COMPUTER PROGRAM, AND STORAGE MEDIUM

BACKGROUND OF THE INVENTION

1. Field of the Invention

The present invention relates to an information processing apparatus, an image processing apparatus, an information processing method, a control method for an image processing apparatus, a computer program, and a storage medium. In particular, the present invention relates to a technology suitable for use in preventing data of a print job from being falsified when the print job is transmitted from an information processing apparatus such as a personal computer to, for example, an image processing apparatus such as a printer through a network.

2. Description of the Related Art

Conventionally, on a system in which print data is printed by sending the print data from an information processing apparatus, such as a client personal computer, to an image processing apparatus, such as a printer, through a network, there is a potential threat in which the print data can be falsified on the sending path. FIG. 1 illustrates the concept of a network printing system having the threat. As shown in FIG. 1, when print data is sent from a print client 101 to a network printer 102 through a network 104 such as a local area network (LAN), an attacker 103 (e.g., a personal computer in which a printer driver is installed) can falsify the printing result by intercepting the print data in the middle of data sending by using a technique such as fabricating the network address of the network printer 102, falsifying the print data, and sending the falsified print data to the network printer 102.

Conventionally, in order to cope with the above threat, regarding prevention of falsification of not only a print job but also data, it is common to check data for falsification such that, after a data generating end calculates a hash value of the entire data by using a hash function, the data generator adds an electronic signature to the hash value, a data verifying end verifies the electronic signature. Regarding prevention of falsification of the print job on the network 104, a checking method using a similar technique has been disclosed (see, for example, Japanese Patent Laid-Open No. 2003-084962).

FIG. 2 is a schematic illustration of calculation of a hash value. At first, after print data 201 is generated, its hash value 202 is calculated, and transmitting data (d1) 203, obtained by adding the hash value 202 to the print data 201, is created. The hash value 202 can be obtained by inputting the print data 201 to a known hash function such as a one-way function such as SHA-1 (Secure Hash Algorithm 1) or MD5 (Message Digest 5).

When receiving the transmitting data (d1) 203, the network printer 102 calculates a hash value from the print data 201 in the received data, and confirms whether the calculated hash value coincides with the hash value 202 included in the transmitting data (d1) 203. This can determine whether or not the print data 201 has been falsified on the network 104.

However, in the case of verifying, using the above method, whether the print data is correct or not, the client PC calculates a hash value after completing generation of all print data, and then sends a network printer the print data. Further, the network printer verifies the hash value after completing reception of all the print data, and then starts a printing operation. This causes a problem in that the start of printing, which is the so-called "first printing", is delayed. This problem notably occurs particularly when print data has an amount reaching several hundred pages.

SUMMARY OF THE INVENTION

The present invention has been made in the above-described circumstance. The present invention enables immediate implementation of the first printing and effective prevention of falsification of print data.

The present invention provides an information processing apparatus including a data dividing unit configured to divide print data into a plurality of data pieces, a hash value generating unit configured to generate a hash value of each of the data pieces obtained by the data dividing unit, a hash value adding unit configured to generate one unit of transmitting data by adding the hash value generated by the hash value generating unit to a predetermined data piece different from the data piece whose hash value is generated, and a data transmitting unit configured to transmit the one unit of transmitting data generated by the hash value adding unit to an image processing apparatus.

The information processing apparatus can further include a hash value storage unit configured to temporarily store the hash value generated by the hash value generating unit. The hash value adding unit can generate the one unit of transmitting data by adding the stored hash value to a predetermined data piece different from the data piece whose hash value is generated.

The hash value adding unit can generate the one unit of transmitting data by adding the stored hash value to a data piece following the data piece whose hash value is generated.

The information processing apparatus can further include an electronic signature adding unit for adding an electronic signature to one unit of transmitting data which is to be initially transmitted by the data transmitting unit.

In addition, the present invention provides an image processing apparatus for performing printing based on print data received from an information processing apparatus, where the print data includes a plurality of data blocks. The image processing apparatus includes a hash value generating unit configured to generate a hash value from each of the data blocks of the print data received from the information processing apparatus, a header information extracting unit configured to extract header information from a predetermined data block different from the data block of the received print data from which the hash value is generated, and a determining unit configured to determine whether the header information extracted by the header information extracting unit coincides with the hash value generated by the hash value generating unit.

The header information extracting unit can extract the header information from a data block following the data block of the received print data from which the hash value is generated.

The image processing apparatus can further include a controller in which, where the determining unit determines that the extracted header information coincides with the generated hash value, the controller continues to perform printing by the image processing apparatus, and, where the determining unit determines that the extracted header information does not coincide with the generated hash value, the image processing apparatus interrupts the printing.

In addition, the present invention provides an information processing method including dividing print data into a plurality of data pieces, generating a hash value of each of the obtained data pieces, generating one unit of transmitting data by adding the generated hash value to a predetermined data piece different from the data piece whose hash value is generated, and transmitting the generated one unit of transmitting data to an image processing apparatus.

The information processing method can further include temporarily storing the generated hash value. The generated one unit of transmitting data can be generated by adding the stored hash value to a predetermined data piece different from the data piece whose hash value is generated.

The generated one unit of transmitting data can be generated by adding the stored hash value to a data piece following the data piece whose hash value is generated.

The information processing method can further include of adding an electronic signature to transmitting data which is initially transmitted.

In addition, the present invention provides a control method for an image processing apparatus for performing printing based on print data received from an information processing apparatus, the print data including a plurality of data blocks. The control method includes generating a hash value from each of the data blocks of the print data received from the information processing apparatus, extracting header information from a predetermined data block different from the data block of the received print data from which the hash value is generated, and determining whether the extracted header information coincides with the generated hash value.

The header information can be extracted from a data block of the received print data which follows the data block of the received print data from which the hash value is generated.

Furthermore, the present invention provides a computer program for allowing a computer to execute an information processing method. The computer program includes dividing print data into a plurality of data pieces, generating a hash value of each of the plurality of data pieces, generating one unit of transmitting data by adding the generated hash value generated to a predetermined data piece different from the data piece whose hash value is generated, and transmitting the generated one unit of transmitting data to an image processing apparatus.

Furthermore, the present invention provides a computer program for executing a control method for an image processing apparatus for performing printing based on print data received from an information processing apparatus, the print data including a plurality of data blocks. The program includes generating a hash value from each of the data blocks of the print data received from the information processing apparatus, extracting header information from a predetermined data block different from the data block of the received print data from which the hash value is generated, and determining whether the extracted header information coincides with the generated hash value.

Moreover, the present invention provides a computer-readable storage medium storing the above computer programs.

Further features and advantages of the present invention will become apparent from the following description of exemplary embodiments with reference to the attached drawings.

DESCRIPTION OF THE EMBODIMENTS

First Embodiment

Figure 1:
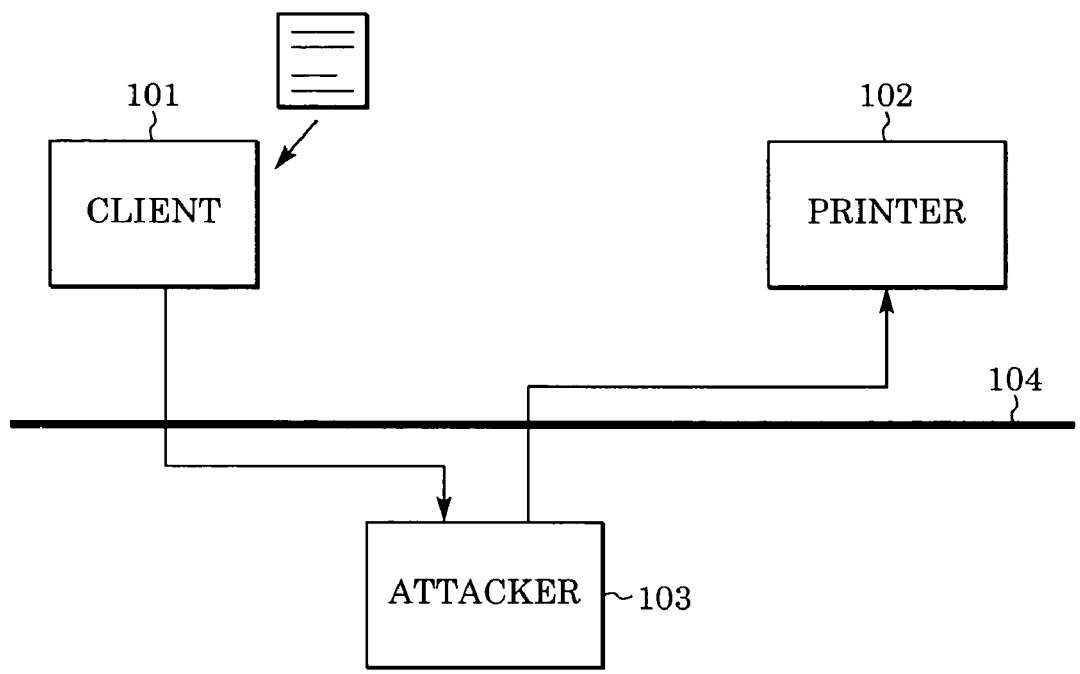
FIG. 1 is a block diagram showing the concept of a threat of data falsification on a network path.
Figure 2:
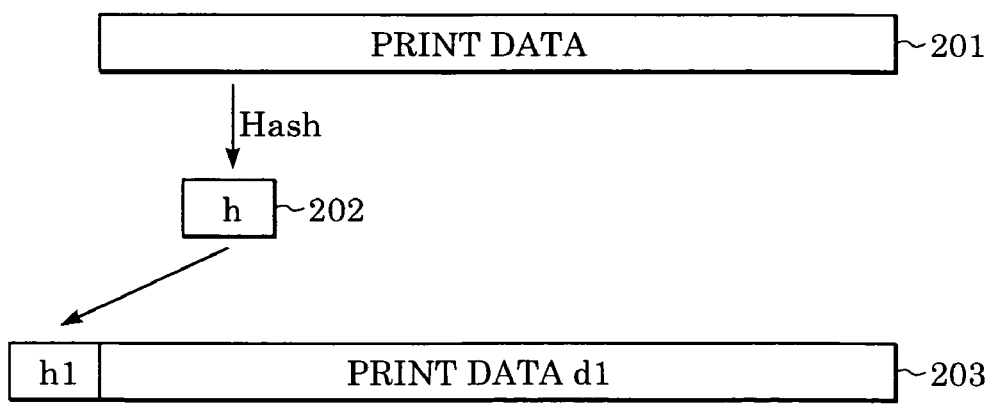
FIG. 2 is an illustration of addition of a hash value.
Figure 3:
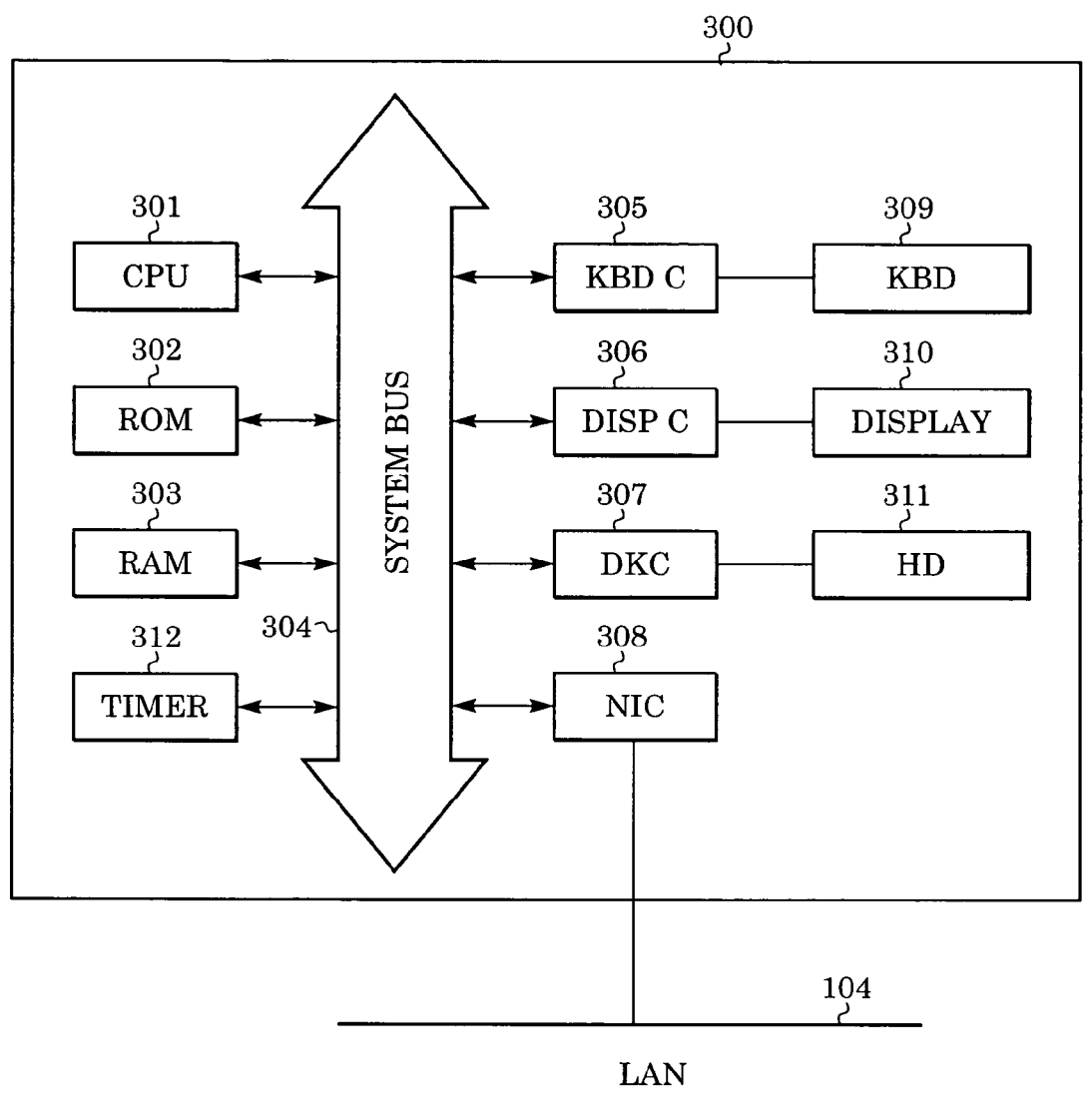
FIG. 3 is a block diagram showing an example of the internal configuration of a print client or printer according to a first embodiment of the present invention.

FIG. 1 is a block diagram illustrating the concept of a network printing system in which the present invention is executed. FIG. 2 is a schematic illustration of hash calculation. FIG. 3 shows the internal structure of a commonly used computer. Each of a controller of a print client 101 and a network printer 102 in a first embodiment of the present invention is similar in configuration to the computer.

Referring to FIG. 3, a computer 300 includes a central processing unit (CPU) 301 for executing software stored in a read-only memory (ROM) 302 or, for example, in a mass storage device such as a hard disk unit (HD) 311 controlled by a disk controller (DKC) 307. In addition, overall, the CPU 301 controls devices connected to a system bus 304.

A random access memory (RAM) 303 functions as a main memory, a work area, etc., for the CPU 301. An external input controller (indicated by "KBD C" in FIG. 3) 305 controls input of instructions from various buttons provided in the computer 300 or a keyboard (KBD) 309. A display controller (indicated by "DISP C" in FIG. 3) 306 controls display by a display module (DISPLAY) 310. A network interface card (NIC) 308 bidirectionally exchanges data with another network device or a file server through a local area network (LAN) 104. The computer 300 also includes a timer 312.

Figure 4:
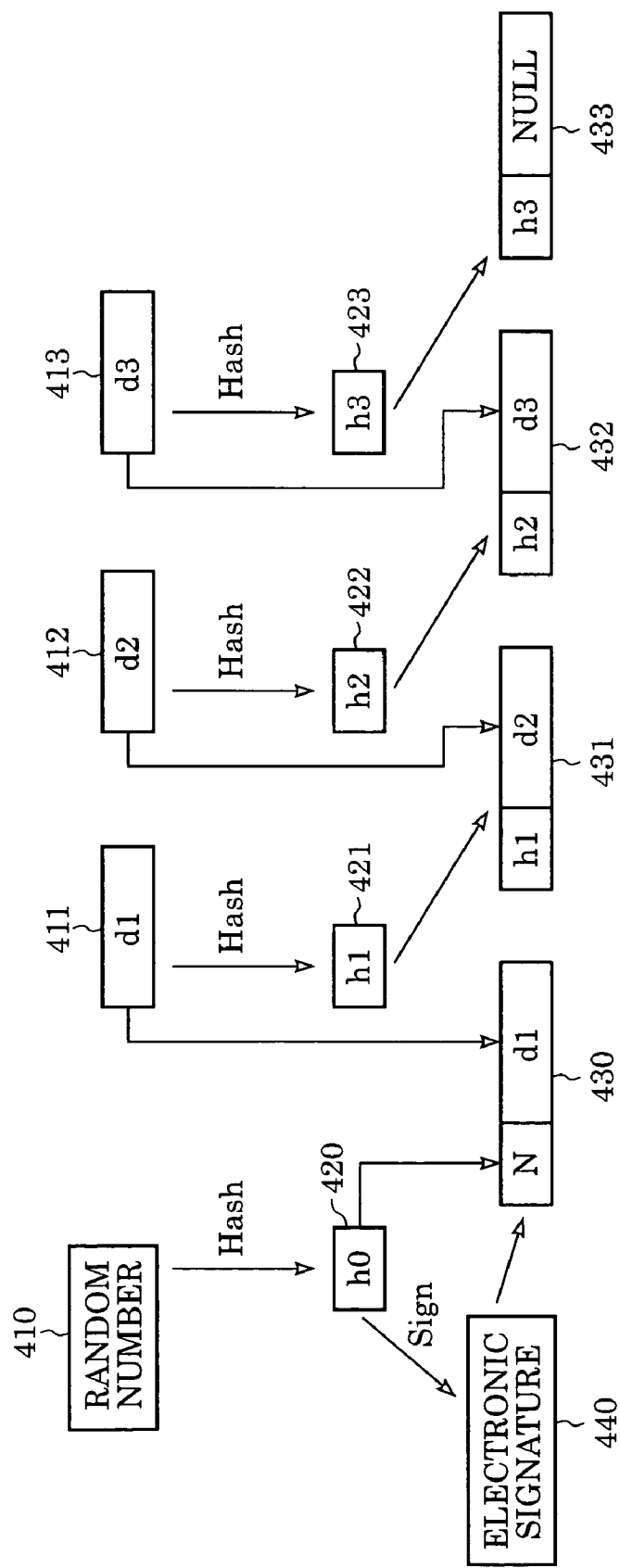
FIG. 4 is an illustration of a hash value adding method according to the first embodiment of the present invention.
Figure 6:
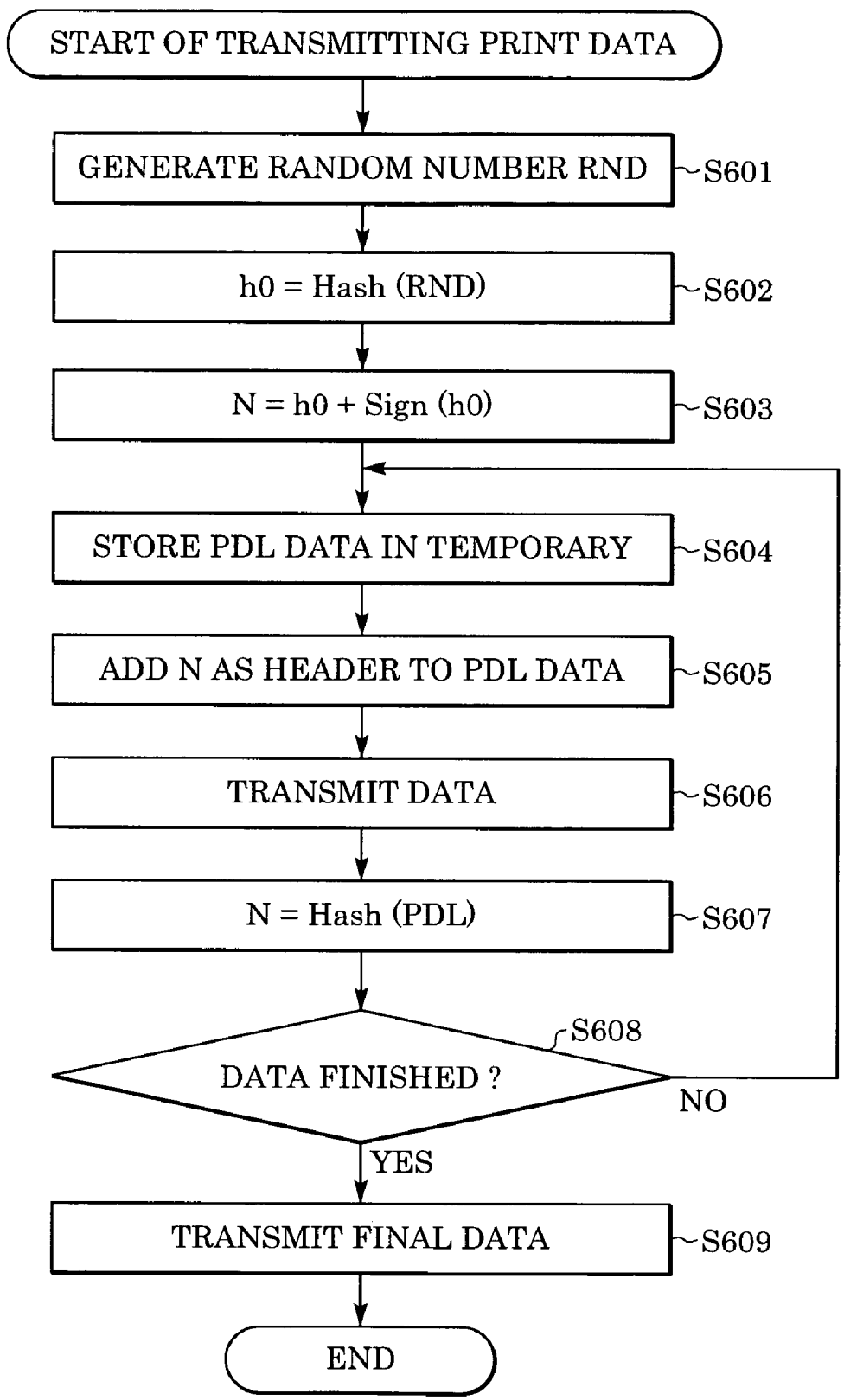
FIG. 6 is a flowchart illustrating a print client according to the first embodiment of the present invention.

FIG. 4 shows a method in the first embodiment in which a hash value is calculated from print data and is transmitted. In addition, FIG. 6 is a flowchart showing the process of the method. The method, which adds a hash value calculated from print data, and transmits the calculated hash value to the network printer 102, is described below in accordance with the process in FIG. 6, and, in addition, with reference to FIG. 4.

The process in FIG. 6 is executed by the CPU 301 on the print client 101. In addition, it is a precondition that data of a document or image to be printed is converted into a form that the network printer 102 can interpret by using a printer driver module, that is, page description language (PDL) data, and the PDL data is sequentially transferred to modules that implement the process in FIG. 6. However, after creating data of an image to be printed by using the printer driver, the process in FIG. 6 may be performed.

In order to send print data, at first, in step S601, calculation for generating random number (RND) 410 is performed. In step S602, a hash value (h0) 420 of the random number 410 generated in step S601 is calculated. In step S603, an electronic signature 440 is added to the hash value (h0) 420 calculated in step S602 to generate a header N. The header N is temporarily stored in the RAM 303.

Proceeding to step S604, form the sequentially generated PDL data, a first portion having a proper length is divided and received as a PDL data piece (d1) 411, and the PDL data piece (d1) 411 is stored in a temporary buffer in the RAM 303. In step S605, the header N temporarily stored in the RAM 303 in step S603 is extracted. Further, in step S605, by adding the header N to the PDL data piece (d1) 411 stored in the temporary buffer in step S604, one unit of transmitting data 430 is formed.

In step S606, by controlling the NIC 308, the transmitting data 430 is transmitted to the network printer 102 through the LAN 104. In step S607, a hash value of the PDL data piece (d1) 411 stored in the temporary buffer is calculated, and the calculated hash value is temporarily stored as a header N to be added to the following PDL data block in the RAM 303. In addition, the temporary buffer in which the PDL data piece (d1) 411 and the header N are stored in combination as the transmitting data 430 is released.

In step S608, it is determined whether print data received from the printer driver has finished. If, in step S608, it is determined that the print data has finished, in step S609, the header information temporarily stored in step S607 is extracted, and a final header N is transmitted to the network printer 102 through the LAN 104 by controlling the NIC 308.

If, in step S608, it is determined that the print data has not finished yet, the process returns to step S604. The following PDL data piece (d2) 412 and a PDL data piece (d3) 413 are sequentially received, and a hash value (h1) 421 of PDL data, a hash value (h2) 422 of PDL data, and a hash value (h3) 423 of PDL data are continuously generated.

By adding the hash value (h1) 421 of PDL data to the PDL data (d2) 412, transmitting data 431 is generated. Similarly, the hash value (h2) 422 of PDL data and PDL data (d3) 413 are combined to generate transmitting data 432. In addition, if there are no PDL data pieces to be combined, the hash value (h3) 423 of PDL data and a meaningless piece (indicated by "NULL" in FIG. 4) of PDL data are combined to generate transmitting data 433. In the above processing, by establishing synchronization between processing timing for generating a hash value of PDL data and timing for receiving a PDL data piece, temporarily storing of the hash value in the buffer can be omitted.

By performing the above process, as shown in FIG. 4, transmitting data is formed by adding a hash value of a preceding PDL data block to the following PDL data block, and is sequentially transmitted. The reason that the signature is added only to the first transmitting data is to prevent the transmitting data from being switched. If the first transmitting data can be prevented from being switched, it is ensured that, after that, all PDL data can be prevented from being switched or falsified.

Figure 5:
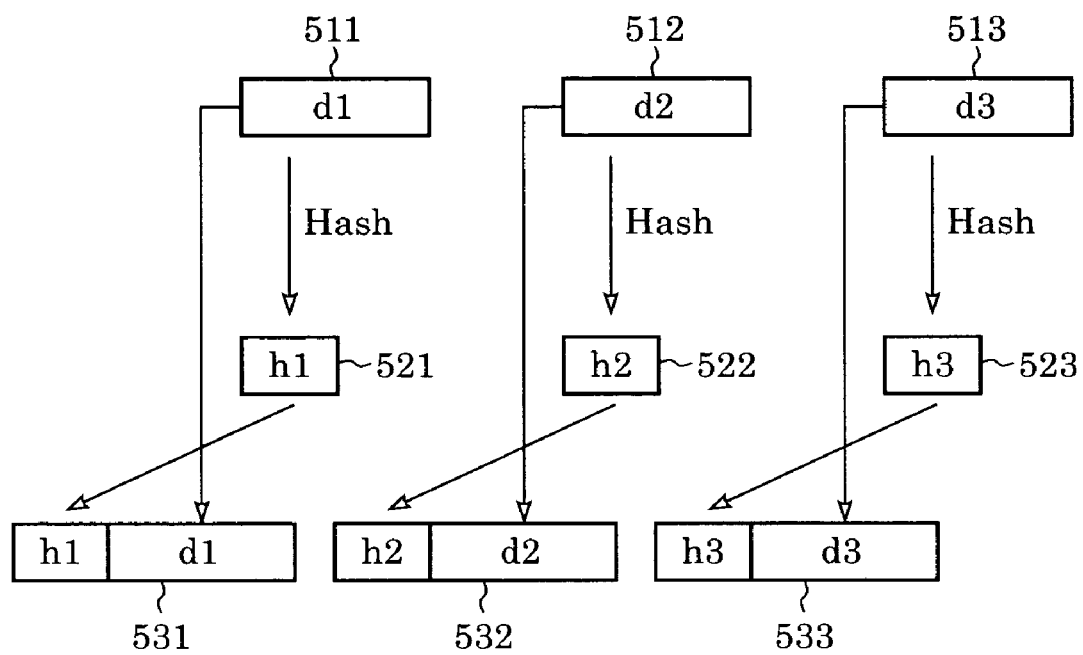
FIG. 5 is an illustration of a hash value adding method in which a threat of falsification remains.

Addition of a hash value to the following data block is based on the following reason. For example, as shown in FIG. 5, when calculated hash values are added to original PDL data pieces (d1) 511, (d2) 512, and (d3) 513, in a view of an attacker who attempts to falsify data, by intercepting data blocks (531, 532, and 533 in FIG. 5) with the hash values added thereto, the attacker can add hash values (521, 522, 523) to falsified data pieces. If transmitting data is switched, a receiving end will fail to notice the switching.

Although, to prevent the switching, one solution is that a client adds an electronic signature to each of all pieces of transmitting data, the electronic signature is a time-consuming operation in this solution, so that an adverse effect occurs in performance. Compared with the above, in the first embodiment, it is necessary to perform an electronic signature only once. Accordingly, this is more advantageous.

Figure 7:
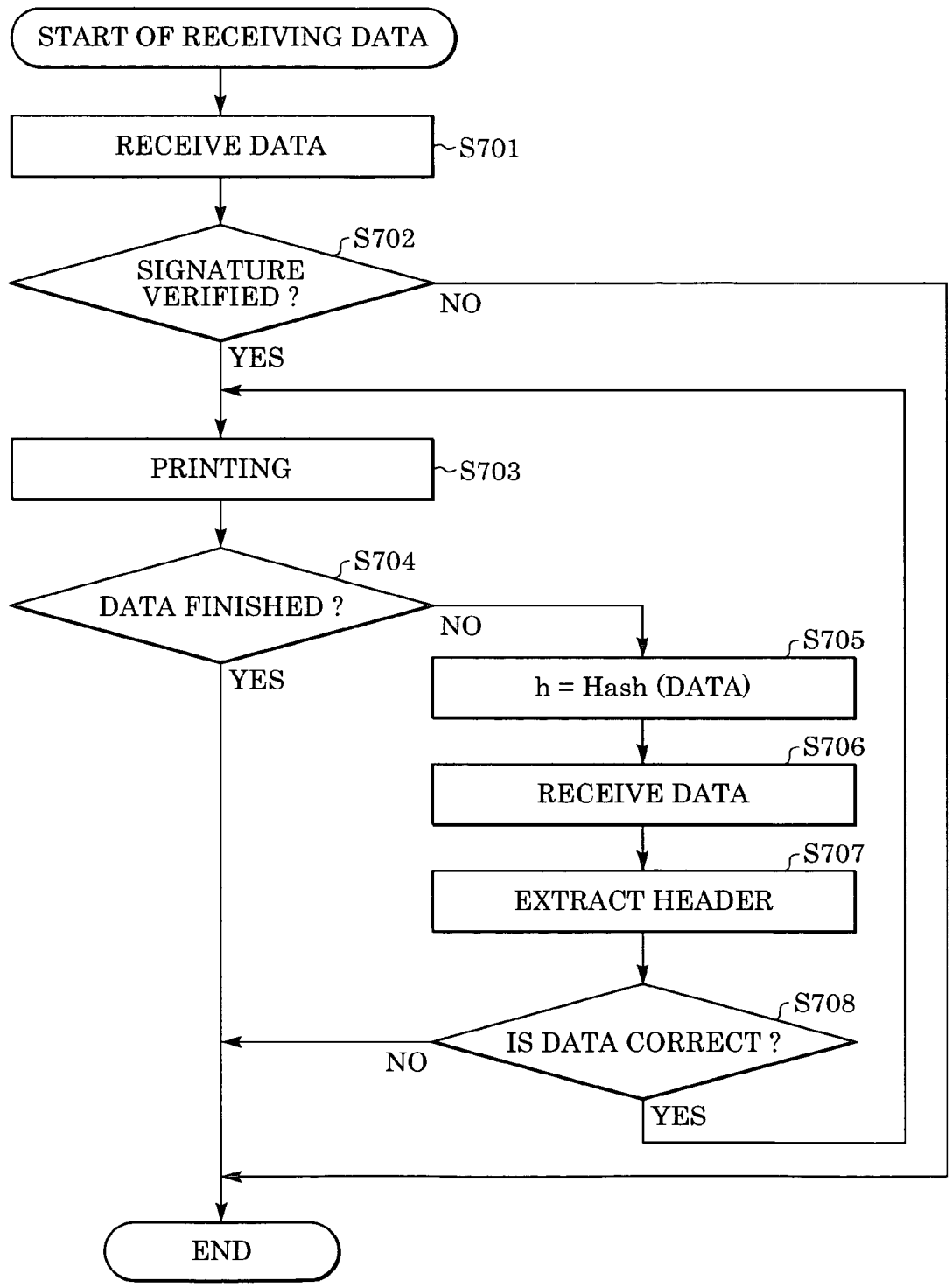
FIG. 7 is a flowchart illustrating the operation of a printer according to the first embodiment of the present invention.

FIG. 7 is a flowchart showing the process of a data receiving operation of the network printer 102 in the first embodiment. The process shown in FIG. 7 is executed by the CPU 301 in the network printer 102.

In the data receiving operation, in step S701, by operating the NIC 308, the first piece of data is received from the LAN 104. In step S702, an electronic signature included in the received data is verified.

If the determination in step S702 indicates that the signature is verified, the process proceeds to step S703. In step S703, PDL data is extracted from the received data and is sent to a printing engine (not shown). The PDL data is printed by the printing engine. In step S704, it is determined whether the received data has finished. If it is determined that the received data has not finished yet, the process proceeds to step S705.

Steps S705 to S708 form processing that sequentially confirms that the received data is not falsified. In step S705, a hash value of the PDL data printed in step S703 is calculated and stored in the temporary buffer. In step S706, by operating the NIC 308, the following piece of data is received from the LAN 104.

In step S707, from the data received in step S706, that is, from the following piece of data, a header portion is extracted. The header portion must have a hash value of PDL data calculated in the client. In step S708, by confirming whether the hash value calculated in step S705 coincides with the hash value extracted in step S707, it is determined whether the data is correct.

If, in step S708, it is determined that the data is correct, the process returns to step S703 and continues printing. If, in step S708, it is determined that the data is not correct, the process is terminated so that printing is immediately discontinued. If, in step S702, it is determined that the signature is not correct, and, in addition, if, in step S704, it is determined that the data has finished, the printing of the received data is terminated.

The print client or network printer program according to the first embodiment may be executed by an externally installed program or each of the print client 101 and the network printer 102. In the above case, the present invention is applicable to even a case in which the program is supplied to the print client 101 or the network printer 102 by loading, to the print client 101 or the network printer 102, information including the program from a storage medium such as CD-ROM, a flash memory, or a floppy disk, or through a network such as electronic mail or personal computer communication.

Figure 9:
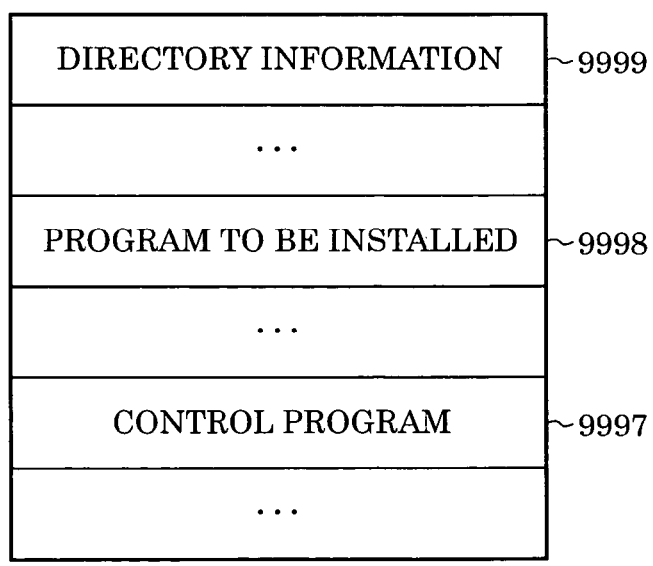
FIG. 9 is an illustration of an example of a memory map in a storage medium of software according to the second embodiment.

FIG. 9 shows a memory map of CD-ROM, which is an example of the storage medium. Referring to FIG. 9, an area 9999 stores directory information, and represents the position of an area 9998 storing another program to be installed or an area 9997 storing a control program for the print client or the network printer 102.

The area 9998 stores the program to be installed. The area 9997 stores the control program for the print client or the network printer 102. In the case of installing the control program into the print client 101 or the network printer 102 in the first embodiment, the program to be installed which is stored in the area 9998 is loaded into the system and is executed by the CPU 301.

Next, the program executed by the CPU 301 reads the print client or the network printer control program from the area 9997, which stores a device control program, and rewrites the content of the ROM 302 by the read program or installs the read program into the HD 311. In this case, the ROM 302 is not a simple mask ROM but needs to be rewritable ROM such as a flash ROM.

The present invention may be applied to a system or integrated apparatus formed by a plurality of apparatuses (e.g., a host computer, an interface device, a reader, etc.), or to a single apparatus.

In addition, an embodiment of the present invention is achieved such that a system or apparatus is provided with a storage medium storing program code of software realizing the functions of the first embodiment, and a computer (or a CPU or MPU) of the system or apparatus reads and executes the stored program code.

In this case, the program code read from the storage medium, itself, realizes novel functions of the present invention, and the storage medium storing the program code is included in the present invention.

Storage media for providing the program code include, for example, a floppy disk, a hard disk, an optical disk, a magneto-optical disk, CD-ROM, CD-R, a magnetic tape, a nonvolatile memory card, and ROM.

The functions in the first embodiment are realized such that the computer executes the read program code. In addition, based on instructions of the program code, an operating system running on the computer performs all or part of actual processing, and the functions in the first embodiment can be realized by the processing.

Furthermore, after the program code read from the storage medium is written into a memory provided in add-in board inserted in the computer or into an add-in unit connected to the computer, based on instructions of the program code, a CPU or the like on the add-in board or the add-in unit performs all or part of actual processing, and also the functions in the first embodiment can be realized also by the processing.

The present invention is applicable to a case in which, from the storage medium storing the program code of software realizing the functions in the first embodiment, the program code is delivered to one that requests the program code through a communication line such as personal computer communication.

Second Embodiment

Figure 8:
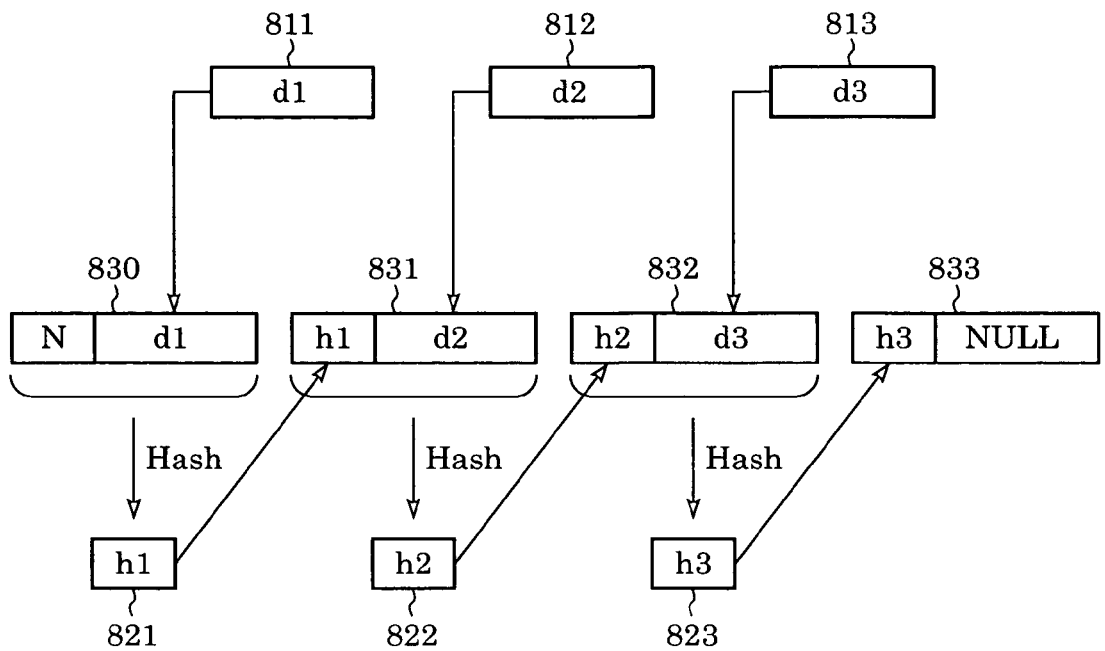
FIG. 8 is an illustration of a hash value adding method according to a second embodiment of the present invention.

Although, in the first embodiment, PDL data pieces (d1) 811, (d2) 812, and (d3) 813 are used as the original data whose hashing is performed, as shown in FIG. 8, a hash value (h1) 821 of the entire transmitting data 830 including a header N, the hash value (h1) 821 may be calculated and added as a header to the following transmitting data.

Similarly, a hash value (h2) 822 of the entire transmitting data 831 including the hash value (h1) and a data piece (d2) may be calculated and added as a header to the following transmitting data. In addition, a hash value (h3) of the entire transmitting data 832 including the hash value (h2) and a data piece (d3) may be calculated and added as a header to the following transmitting data. Moreover, a hash value of the entire transmitting data 833 including the hash value (h3) and a data piece (NULL) may be calculated.

Third Embodiment

Although, in the first embodiment, a hash value is added to the "following" data piece, a position in which the hash value is added is not limited to the "following" data piece. For example, the hash value may be added to the second following data piece. In other words, it is important to add a hash value of a data piece to a data piece other than the original data piece from which the hash value is calculated.

According to the present invention, even if the amount of print data is very large, the first printing can be immediately performed without delaying sending of data, and, in addition, falsification of print data can be effectively prevented.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-188488 filed Jun. 25, 2004, which is hereby incorporated by reference herein.

What is claimed is:

1. An image processing apparatus for performing printing based on print data received from an information processing apparatus, the image processing apparatus comprising:

a print data receiving unit at a network printing side configured to receive a plurality of data blocks of the print data which are separately transmitted from the information processing apparatus on a client side, the plurality of data blocks of the print data originating from a print job; and a processor configured to generate a hash value from each of the data blocks of the print data received by the print data receiving unit, extract header information from a predetermined data block following the data block of the received print data from which the hash value is generated, determine whether the extracted header information coincides with the generated hash value, and cause the image processing apparatus to perform printing based on a determination of whether the extracted header information coincides with the generated hash value, wherein an electronic signature is added to a first data block of the plurality of data blocks received by the print data receiving unit, and the processor inhibits the image processing apparatus from performing the printing in a case where the processor verifies that the electronic signature is not correct, and wherein the data block is formed by adding a hash value from a data piece of a preceding data block to following data block, the data block includes the data piece and the header information indicating the hash value, and the hash value indicated by the header information included in the data block for a data block subsequent to the first block is generated from a data piece included in the preceding data block.

2. The image processing apparatus according to claim 1, wherein the processor determines that the extracted header information coincides with the generated hash value, continues to perform the printing by said image processing apparatus, and, where the processor determines that the extracted header information does not coincide with the generated hash value, said image processing apparatus discontinues the printing.

3. A control method for an image processing apparatus for performing printing based on print data received from an information processing apparatus, the control method comprising:

receiving a plurality of data blocks of the print data at a network printing side which are separately transmitted from the information processing apparatus on a client side, the plurality of data blocks of the print data originating from a print job;

generating a hash value from each of the data blocks of the print data received by a print data receiving unit;

extracting header information from a predetermined data block following the data block of the received print data from which the hash value is generated; and determining whether the extracted header information coincides with the generated hash value; and printing, by the image processing apparatus, based on a determination of whether the extracted header information coincides with the generated hash value, wherein an electronic signature is added to a first data block of the plurality of data blocks received by the print data receiving unit, and the processor inhibits the image processing apparatus from performing the printing in a case where the processor verifies that the electronic signature is not correct, and wherein the data block is formed by adding a hash value from a data piece of a preceding data block to following data block, the data block includes the data piece and the header information indicating a hash value, and the hash value indicated by the header information included in the data block for a data block subsequent to the first block is generated from a data piece included in the preceding data block.

4. A computer-readable storage medium storing a program for executing a control method for an image processing apparatus for performing printing based on print data received from an information processing apparatus, the control method comprising:

receiving a plurality of data blocks of the print data at a network printing side which are separately transmitted from the information processing apparatus on a client side, the plurality of data blocks of the print data originating from a print job;

generating a hash value from each of the data blocks of the print data received by a print data receiving unit;

extracting header information from a predetermined data block following the data block of the received print data from which the hash value is generated; and determining whether the extracted header information coincides with the generated hash value; and printing, by the image processing apparatus, based on a determination of whether the extracted header information coincides with the generated hash value, wherein an electronic signature is added to a first data block of the plurality of data blocks received by the print data receiving unit, and the processor inhibits the image processing apparatus from performing the printing in a case where the processor verifies that the electronic signature is not correct;

wherein the data block is formed by adding a hash value from a data piece of a preceding data block to following data block, the data block includes the data piece and the header information indicating the hash value, and the hash value indicated by the header information included in the data block for a data block subsequent to the first block is generated from a data piece included in the preceding data block.

* * * * *